United States Patent [19]

Nelson

[11] Patent Number: 4,823,265
[45] Date of Patent: Apr. 18, 1989

[54] RENEWABLE OPTION ACCOUNTING AND MARKETING SYSTEM

[76] Inventor: George E. Nelson, 11816 Douglynn Dr., Minnetonka, Minn. 55343

[21] Appl. No.: 48,629

[22] Filed: May 11, 1987

[51] Int. Cl.4 .............................................. G06G 7/52
[52] U.S. Cl. .................................... 364/408; 364/406
[58] Field of Search ................................ 364/408, 406

[56] References Cited

U.S. PATENT DOCUMENTS

| | | |
|---|---|---|
| 4,321,672 | 3/1982 | Braun et al. |
| 4,334,270 | 6/1982 | Towers |
| 4,346,442 | 8/1982 | Musmanno |
| 4,376,978 | 3/1983 | Musmanno |
| 4,390,968 | 6/1983 | Hennessy et al. |
| 4,412,287 | 10/1983 | Braddock, III |
| 4,486,853 | 12/1984 | Parsons ............................ 364/408 |
| 4,566,066 | 1/1986 | Towers |
| 4,597,046 | 6/1986 | Musmanno et al. |
| 4,598,367 | 7/1986 | DeFrancesco et al. |

OTHER PUBLICATIONS

"Characteristics and Risks of Standardized Options," dated Sep. 1985.

Primary Examiner—Jerry Smith
Assistant Examiner—Steven Kibby
Attorney, Agent, or Firm—Merchant, Gould, Smith, Edell, Welter & Schmidt

[57] ABSTRACT

A system and method for processing transactions in renewable options in stocks or other securities. The system provides means for entry of customer data and renewable option transaction data, means for processing the data, and means for storing the data. Included in the transaction data is data regarding the criteria under which the renewable option investment will be renewed, as well as data indicating the renewal premium for renewing the renewable option, which may be a fixed amount or an amount based on additional data. Through this system, the renewable option may be renewed periodically for a fixed period, until a designated event occurs, or perpetually. Means for storing criteria under which the renewable options are exercised, sold, or allowed to expire, and for processing the exercise, sale, or expiration of such renewable options, are also disclosed. Also disclosed is a method for processing transactions in such renewable options.

25 Claims, 17 Drawing Sheets

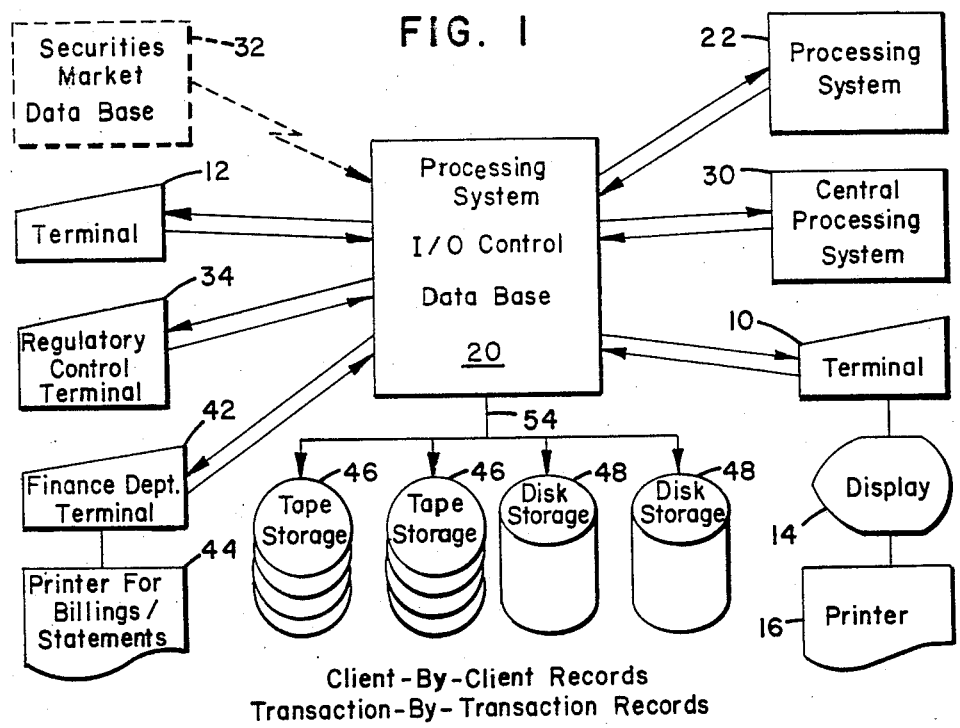
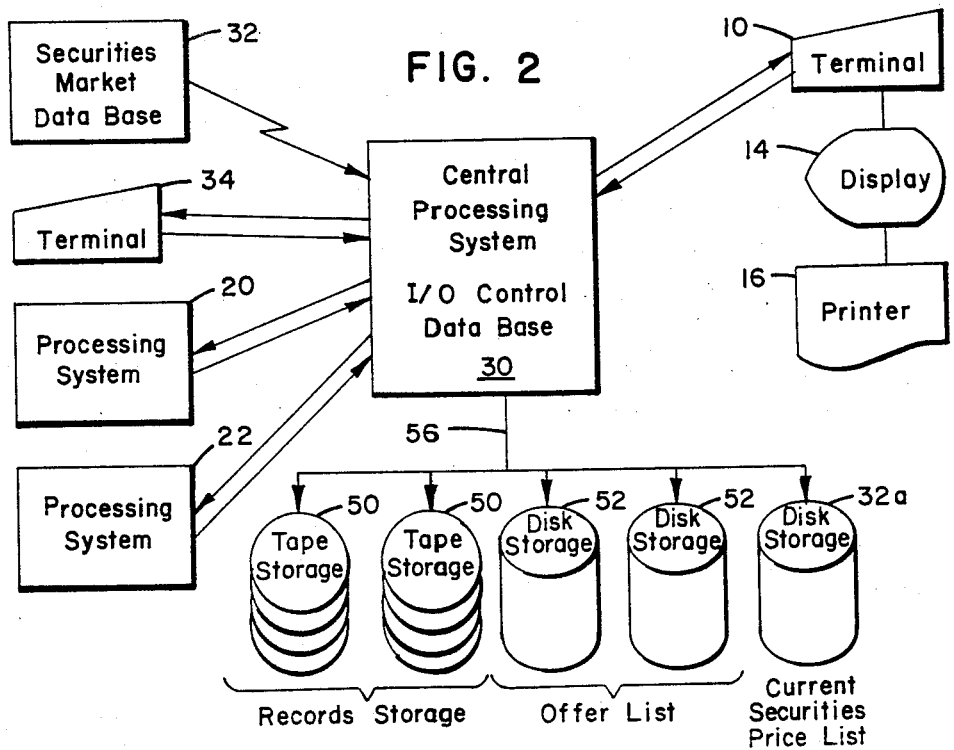

(1) Account #
    Name            [_____] ← 72
    Address         [_____]
    Phone No.       [_____]
    Owns R.O.       [  Y  |  N  ]
    Writes R.O.     [  Y  |  N  ]
    Statement Period [Monthly|Quarterly]
         .
         .
         .

(2) Account #      [_____]
         .
         .
         .

(N) Account #      [_____]
         .
         .
         .

FIG. 3

TRANSACTION BY TRANSACTION R.O. RECORDS (A) Transaction No.

Security

Owner Account No.

Writer Account No.

Strike Price

No. Transferred

Put/Call    P | C

Initial Payment

Amount of or
    Formula for Periodic Payment

Date of Transaction (B) Transaction No.

.
    .
    .

(X) Transaction No.

CUSTOMER CURRENT ACCOUNT STATUS (A) Customer Account #

(1) R.O. Owned (a) Security (1) Writer of Record

Strike Price

No. Bought

Put/Call    | P | C |

Limit Order

Renewal Expiration Date

Renewal Status    | A | B | C | D | E |

(Precalculated) Periodic Payment

Date of Transaction (2) Writer of Record

...

(n) Writer of Record (b) Security

...

(x) Security

FIG. 4b

OFFER LISTINGS (A) Security (1) Buyer's Listing (a) Strike Price
or at Security Market Price (1) R.O. Offer Price
or F (Security Market Price)

(a) Offeror Account No.

[Listing Agent No. ]

Offeror Name

No. to be bought

Put/Call     P | C

Form of Order   L | S | M
(Limit/Stop/Market)

Date/Time/Number (x) Offeror Account No.

.
        .
        .

(2) R.O. Offer Price

.
          .
          .

(n) R.O. Offer Price

.
          .
          .

(b) Strike Price

FIG. 4c (2) Seller's/ Writer's Listing (a) Strike Price (1) R.O. Offer Price (a) Offeror Account No.
           .
           .
           .

No. to be Written
           .
           .
           .

(x) Offeror Account No.
           .
           .
           .

(2) R.O. Offer Price
         .
         .
         .

(n) R.O. Offer Price
         .
         .
         .

(b) Strike Price
      .
      .
      .

(x) Strike Price
      .
      .
      .

R.O. CALLS LISTING

Security: XXX Corp.

Market Price: $100.00

Date/Time: March 2, 1987; 2 p.m.

| Strike Price | Write Offer | Buyer Offer |
|---|---|---|
| Market | 5% of Market Price | 5.25% of Market Price |
| 90 | 12 3/4 | 13 |
| 95 | 8 1/2 | 8 5/8 |
| 105 | 3 1/8 | 3 3/8 |

FIG. 5a

ACCOUNT STATEMENT

Customer Name: George Nelson

Account No.: 1234-56-R.O.

Date: February 28, 1987

Transactions

Period Jan. 31, 1987 - Feb. 28, 1987

| Date | Buy/Write | Security | Put/Call | # Shares | R.O. Price | Strike Price | Credit/Debit |
|------|-----------|----------|----------|----------|------------|--------------|--------------|
| 2/1/87 | Buy | ABC, Inc. | Put | 100 | 4.25 | 85 | $-425 |
| 2/15/87 | Write | XXX Corp. | Call | 100 | 4.00 | 80 | $+400 |

Account Status

| Buy/Write | Security | Put/Call | # Shares | Strike Price | Premium Each | Total | Renewal Date | Renewal Status |
|-----------|----------|----------|----------|--------------|--------------|-------|--------------|----------------|
| Buy | ABC, Inc. | Put | 100 | 85 | 4.25 | $425 | 3/31/87 | E |
| Write | XXX Corp. | Call | 200 | 95 | 4.75 | $950 | 3/31/87 | A |
|  |  |  | 100 | 100 | 5.00 | $500 | 3/31/87 | B |

FIG. 5b

RENEWAL STATUS CODES

A. Renew Put/Call, regardless of market price of security;

B. Allow Call to expire if market price is below strike price. Otherwise, renew the Call;

C. Exercise Call if market price exceeds strike price on expiration date. Otherwise, renew the Call.

D. Allow Put to expire if market price exceeds strike price on expiration date. Otherwise, renew the Put.

E. Exercise Put if market price is below strike price on expiration date. Otherwise, renew the Put.

F. Exercise Call option when market price of security is equal to or greater than selected limit price. Otherwise, renew.

G. Exercise Put option when market price of underlying security is equal to or less than selected limit price. Otherwise, renew.

⋮

Y. Exercise Call if market price exceeds strike price on expiration. Otherwise, allow Call to expire.

Z. Exercise Put if market price is less than strike price on expiration. Otherwise, allow Put to expire.

FIG. 5c

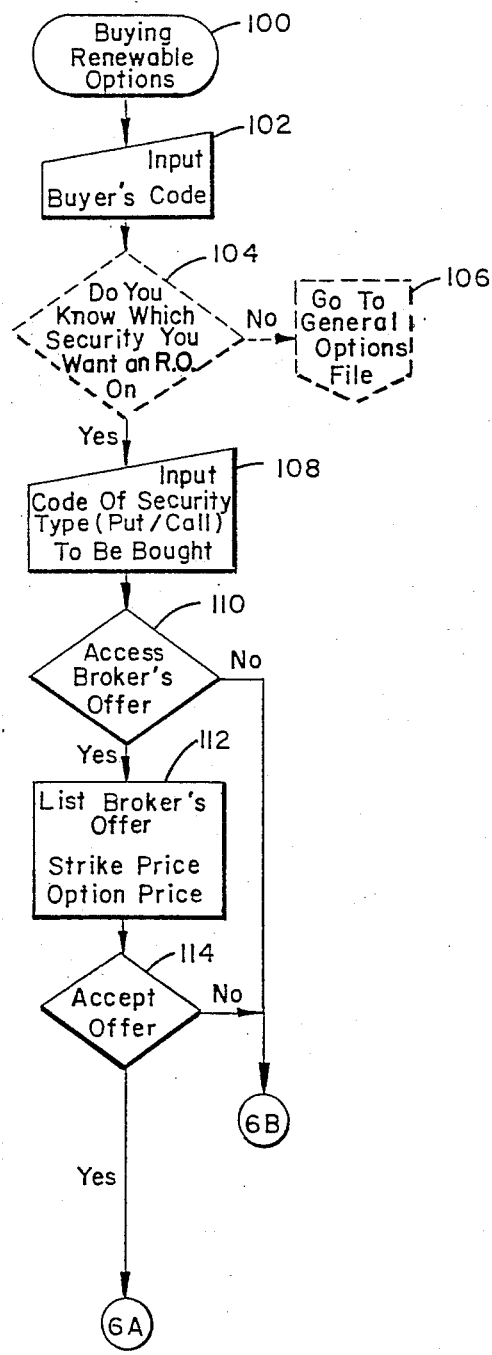
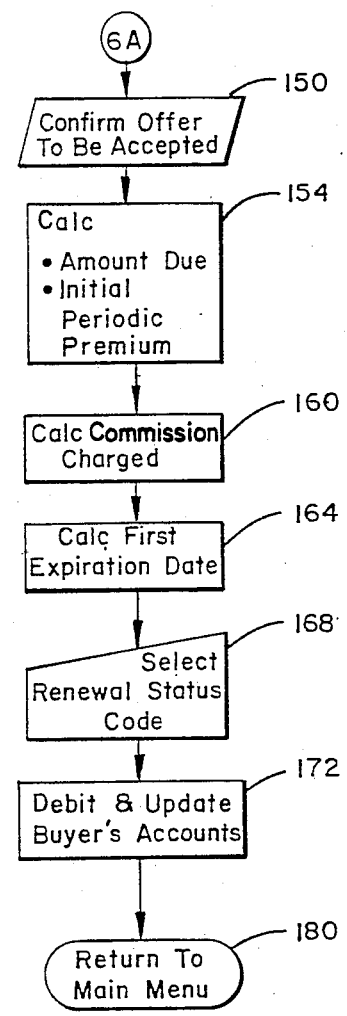
FIG. 6
FIG. 6A

RENEWABLE OPTION ACCOUNTING AND MARKETING SYSTEM

FIELD OF THE INVENTION

This invention relates to investment accounting and marketing systems and, more particularly, to such a system for processing transactions in investments hereinafter referred to as renewable options.

BACKGROUND OF THE INVENTION

Institutions such as brokerage houses historically have used automated systems to process transactions in such investment vehicles as stocks, bonds, other securities, and options. In the case of options, these systems process transactions in which the buyer of the option purchases the right to buy (in the case of a call) or sell (in the case of a put) a certain number of shares of a particular security at a given price. The purchaser of this right must exercise it before the expiration date of the option. If the buyer fails to exercise the option by the expiration date, or if the price of the underlying security for the option is such that the option is valueless immediately before its expiration, the purchaser of the option loses his or her entire investment.

On the other hand, such non-renewable options provide the purchaser with a great deal of leverage in that much higher returns on investment can be achieved with such options than can be achieved with transactions in underlying securities. Furthermore, while the option purchaser may lose his entire investment, the total amount of such an investment per option is typically much less than the price of the underlying security and thus places a limit on the amount of money an investor can lose. Further, such investments allow purchasers to participate in price changes of securities with far smaller investments than are required for purchasing underlying securities.

The present invention solves these problems by providing a system and method for processing transactions in investment vehicles which provide purchasers with the leverage and other advantages of non-renewable options, yet which also have the greater stability and long-term value of investing in underlying securities. Such a renewable option system and method would allow for repeated renewal of the options for such time periods as the lifetime of the option owner or even have no expiration (e.g. a permanent option). Ideally, such a renewable option system and method would be adaptable for dealing in transactions through a multiuser market, or through matching individual buyers and sellers of such an investment. Such a renewable option system and method should also be adaptable for meeting regulatory requirements and being monitored by a regulatory agency, if necessary.

SUMMARY OF THE INVENTION

An accounting and marketing system is provided for handling transactions in renewable option securities. More particularly, a terminal means is issued for entry and display of data including customer data such as a customer name and customer address, and renewable option data including data describing the security involved in the transaction, the number of options involved, the strike price of the option, and other relevant information. The system also includes means for processing the data entered in the terminal means and means for providing data transfer between the terminal means and the programmed processor means. The system also includes data storage means electrically interconnected to the program processor means for storing data entered at the terminal means, including customer data and transaction data. The system also provides for means for entry, display, processing, and storage of information including a period under which the renewable option will be renewed, and the renewable option premium if the option is to be renewed. Also provided is a method for accounting and marketing a renewable option transaction in a security comprising the steps of purchasing a selected number of renewable options in a particular security at a strike price and premium price which is fixed or calculable based on market data. Additional steps include storing the number of renewable options purchased, the name of the security underlying the option, the strike price, the premium price or formula for determining the premium price, and other relevant data. The method also includes the step of storing the conditions under which the renewable option is to be renewed, accessing appropriate data from which the determination can be made as to whether the renewal criteria have been satisfied, and renewing the renewable option if the renewal criteria are satisfied.

BRIEF DESCRIPTION OF DRAWINGS

FIG. 1 is a block diagram of a renewable option accounting and marketing system according to the present invention.

FIG. 2 is a block diagram of a renewable option accounting and marketing system in accordance with the present invention which is different from FIG. 1 in that records storage and other data storage shown is part of a central processing system.

FIG. 3 is a block diagram representing a client data file for storing information in accordance with the present invention.

FIGS. 4a, 4b, 4c and 4d are block diagrams of other data files, including transaction-by-transaction renewable option records (FIG. 4a), customer current account status records (FIG. 4b), renewable options offer records (FIG. 4c) and an alternate embodiment of such records (FIG. 4d).

FIGS. 5a, 5b and 5c are diagrams representing possible video screen displays of the renewable option accounting and marketing system.

FIGS. 6, 6a, and 6b are flow charts representing the steps followed by the system in completing the purchase of a renewable option.

DETAILED DESCRIPTION OF THE INVENTION

Figure 6B:
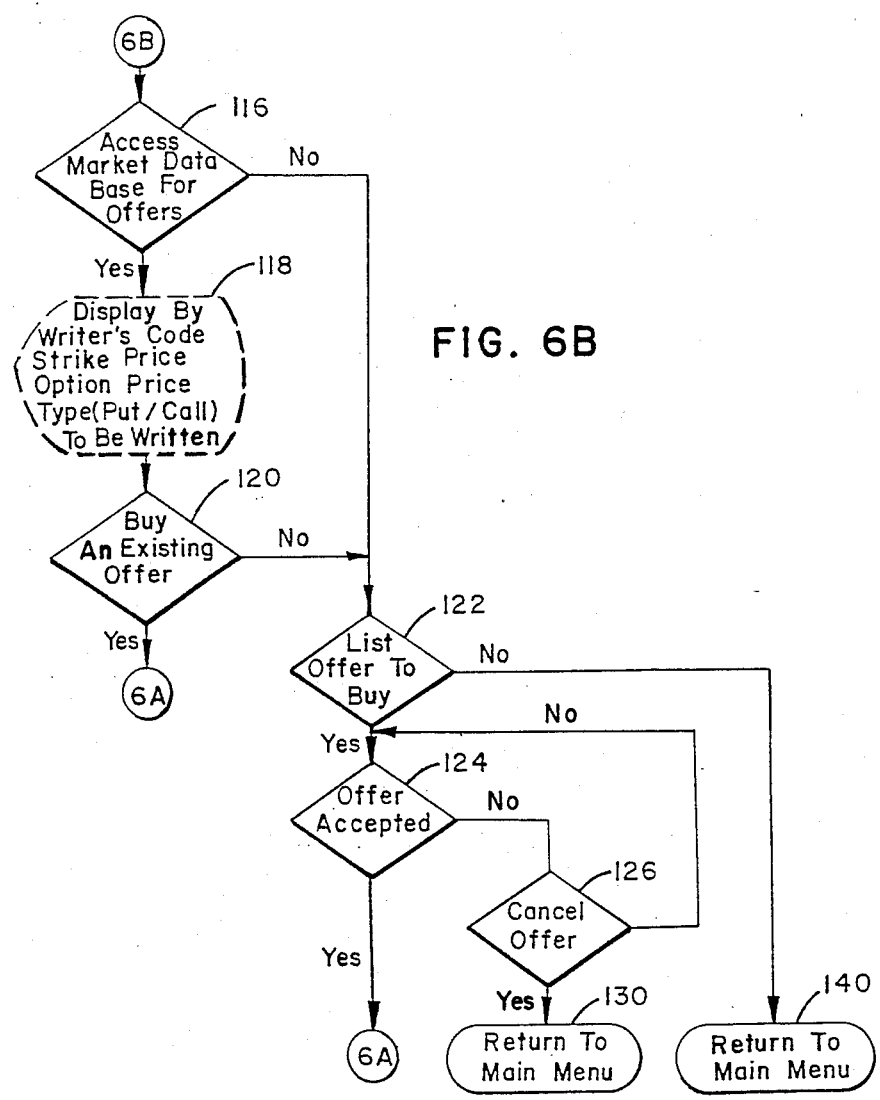

Referring now to the drawings, and more particularly to FIG. 1, there is shown a renewable option accounting and marketing system constructed in accordance with the invention. User terminals 10 and 12 are shown for entering account information for buyers and sellers of renewable options, as well as entering offers to buy, sell, and write renewable options. User terminals 10 and 12 are linked by a data communications link to processing system 20. In the embodiment depicted in FIG. 1, two processing systems 20 and 22 and a central processing system 30 are shown. It would be recognized by one skilled in the art that the processing functions of processing systems 20, 22 and 30 may be included in a single unit or in a plurality of units interconnected by data communications links within the spirit of the invention.

The processing systems process information and inputs from the user terminals, store buyer and seller account records, and access client financial account records and current market information n underlying securities as well as in renewable options. The processing systems also may include means for determining the current date and time. The system may receive date and time inputs from users at input terminals, or access an internal clock for this purpose. Such processing may be internal at an institution such as a brokerage firm which creates its own market in renewable options. Alternatively, a central processing system 30 may also be used which is accessible by a variety of institutional and other users to create a broader market in renewable options. A central processing system may, for example, be part of a central renewable options exchange. The central processing system may include more than one central processing system, for example, to also access market information for underlying securities which may exist at a central exchange. A separate central system for underlying securities market information is designated by system 32. Finally, it may be necessary to regulate transactions in renewable options, e.g. to halt trading in renewable options when necessary. Access to the system to execute such regulatory control decisions is represented by regulatory control terminal 34 which is connected by data communication links to the processing system 20.

Data storage means such as tape storage 46 and disk storage 48 are shown connected to processing system 20 by data bus 54. Data storage means 46 and 48 store information such as client account information, financial records of clients and records including data describing each client's holdings in renewable options (including purchases and writings). For a system which does not interact with a separate central processing system 30, the data storage means accessible by the processing system 20 will also include access to the data, as shown in FIG. 2 and discussed below, accessible by the central processing system. Processing system 20 also has access to securities market data via securities market database 32. The processing system also has access to various output devices such as terminal 42 for printing out periodic statements and billing statements for each client.

The central processing system (CPS) 30 is shown in FIG. 2. Data storage means such as tape storage 50 and disk storage 52 are shown connected to the central processing system 30 by data bus 56. The storage means includes storage of records such as current offers to buy and write renewable options, listed by relevant information such as the name of the underlying security and the strike price requested. In a centralized system using a CPS 30, data links from the CPS to several terminals, such as broker terminal 10, and several processing systems such as processing systems 20 and 22 will exist. Information with respect to current prices of underlying securities will either be accessible within the central processing system 32a, or externally accessible by the central processing system such as through market information database 32.

FIGS. 3, 4a, 4b and 4c show examples of how the data files for various types of data stored in the system may be kept. Data storage means 46 and 48, for example, will include client information files such as the file depicted in FIG. 3. FIG. 3 shows a data file 72 including memory locations for account numbers, name, address, and phone numbers of each client. A file would be kept for each client.

FIG. 4a shows an example of a data file 74 for storing information with respect to renewable options in transaction-by-transaction form. Such data storage is one example of the data stored in the storage means such as means 46 and 48. Each transaction may be designated by a transaction number. The account number of the buyer and seller/writer may be stored. Other information regarding the renewable option transacted, such as the name of the underlying security, the strike price, the number of renewable options transferred, and whether the option is a put or a call, may also be stored. Other information may be included in this file, such as the renewal/expiration date of the renewable option, the date of the transaction, the initial price of the renewable option, and the amount of the periodic payments (or the formula from which this amount may be calculated). Some of this information will not have to be stored for each transaction in some systems. For example, writer/seller account numbers may not be needed in systems which writing and selling are limited to a single or a small number of entities. Similarly, the renewal/expiration date may not be needed if the renewal dates are standardized. Other data files described herein are similarly only exemplary and may not require storage for all the data described in some systems.

Account information such as the statement period, whether the client writes, or both writes and buys renewable options, and other relevant information may also be stored. FIG. 4b provides an example of additional data which may be stored in a client renewable option account such as may be stored at storage means 50, 46, or 48. Subsets within this data file would include a file of renewable options owned by the particular client, which may be designated by information such as security name or code, the strike price of the renewable option, the number of renewable options owned, the date of the transaction, whether the transaction involved is a put or a call, and the renewal/expiration date of the renewable option. Information with respect to the renewable option premium due by the next renewal/expiration date of the option may take a variety of forms. A precalculable periodic payment amount may be stored as shown. Alternatively, data from which the next periodic payment amount may be calculated, such as the market price of the underlying security at the time the renewable option was purchased, may be stored in this data file for processing by the processing system 20. Data file 76 is exemplary of a plurality of data files describing each renewable option owned by the client.

Similarly, a renewable option writer file with information reciprocal to the information stored in option owner file 76 may be stored in storage means 48, 50 or 52. The renewable option writer file will include means for storing such information as the name of the security underlying the renewable option, the number of renewable options written, the strike price of the renewable option, the renewable expiration date, and whether the renewable option is a put or a call. Information with respect to the amount of the premium due by the next expiration date may also be included, which may be either a precalculable amount or a number determined from stored data (such as the market price of the security at the time the renewable option was written) as described for renewable option owner account 76.

Renewable call option writers will be required to cover the option written, typically by either owning the security underlying the renewable option or holding appropriate purchase orders in the underlying security. Renewable put option writers will be required to hold an appropriate short position in the underlying security. To insure adequate coverage for each renewable option written by the writer, information such as the number of shares of the underlying security owned by the writer (in this case of call options) and the existence of stop or limit orders in the security may also be stored in the renewable option writer file.

FIG. 4c shows a data file 78 which may be used to store offers to buy and write renewable options in data storage means 52. The file is part of one system which may be used to link buy and sell offers in a system having many buyers and sellers. As one alternative to this system, as shown in FIG. 4d, a single writer may write all the options requested from a particular broker at prices reflecting renewable option market prices or by other formulas (such as a function of current interest rates).

For the system shown, however, the data file includes means for storing an account number, and may also include means for storing a listing agent account number which may be necessary if the data file is kept in a central location accessed by more than one listing agent. The data file also includes means for storing information such as the identifier for the underlying security, whether the offer is for a put or a call renewable option, whether the offer is to buy or to sell or write a renewable option, and the number of renewable options offered. The strike price may be stored in the offer data file, either as a preselected number or by a number which varies with the market price of the underlying security (e.g. a fixed percentage). An offer price is also listed which is either a preselected amount or an amount which varies according to a predetermined formula, typically as a function of the market price of the security. The date and time of the offer should be recorded as well, or some other indicator of the sequence of the offer as compared to other offers such as an offer number. Finally, means for storing the type of offer should be provided to indicate whether the offer is a limit order, a stop order, or an order to buy, sell, or write at the prevailing market conditions.

FIG. 5a shows an example of one display which may appear on a CRT screen or other output device in conjunction with the invention. The screen shown displays the current bid and ask prices for renewable options in a given security, designated as XXX Corp; as may be displayed for a multi-access system such as an exchange.

The current market price of the underlying security is listed on the display. Offer prices are listed according to strike price, which may (as shown) be described in set increments, or may be equal to or related to the current market price of the security. Bid (buyer offer) and asked (written offer) prices are also listed for each strike price. Alternatively, a single price representing the current market price of the renewable option at each strike price may be listed. As a third alternative, the price of each renewable option may also be set by the listing agent or the writing agent for the listing agent if the market is generated internally by the listing agent rather than through a multi-access exchange. Prices may even be set by standardized formulas. Prices may obviously be affected by a variety of factors, but writers may well choose to list the price of the renewable options as a fixed percent of the strike/market price on the basis of prevailing interest rates and stock dividends yields, for example.

A CRT screen or other suitable display device may also be used to display client account information and prompt the user for selecting various options as indicated by the flow charts described below.

FIG. 5b shows an example of an account statement for a client owning renewable options. The account statement may appear on a CRT screen, printed on paper and distributed to the customer, or by other output means. The account statement will include the customer name and account number and the date. Although not shown here, the statement may be combined with information from other customer accounts. In one version of the statement, as shown, renewable option account status information is divided into renewable options owned and renewable options written. The example account shown in FIG. 5b is such an account statement for a customer who owns renewable options but whose current account includes no options written by the customer. A statement for written options would have similar information plus it may have information regarding the account holder's position in underlying securities. The information in the renewable options owned section of the statement includes the description of each option held by name of the underlying security, whether the option is a put or a call, the number of options held, strike price, the premium due by the next renewal date, the renewal date (if already determinable), and the renewal status of each security.

FIG. 5c lists possible renewal status codes for use in accordance with the invention. These codes may be used as shown in FIG. 5b to designate the status of each particular renewable option owned by the customer, or may designate the status for all renewable options owned by a particular customer. The status of each option is stored with other data regarding each option owned by a customer, so that the system may either execute the renewable option, allow it to expire, or renew the option without further instructions. The status codes may be default codes in that they may be replaced, for example, by an order to immediately execute the renewable option. If such an order is received by the system, the system would automatically branch to the EXERCISE subprogram discussed below.

As suggested by the renewal status codes shown in FIG. 5c, the determination of whether to renew, execute, or allow to expire a given renewable option depends on both the decision of the owner of the option or agent of the owner reflected by the choice of renewal status codes (inputted either directly by the option owner, or through his broker or other agent), and prevailing market conditions in the underlying security. For the account shown in FIG. 5b, for example, the customer's call renewable option for 200 shares (i.e., 2 options) of XXX Corp. at a strike price of $95 has renewal status A. Under this renewal status, if the price of shares of XXX Corp. are $95 or more, the customer account will be automatically debited for the amount of premium ($475 per option contract) when the premium payment becomes due.

If the price of XXX Corp. shares falls below $95, the call option premium due may either remain at the precalculated amount, default to a second (lower) predetermined amount, or be calculated according to prevailing market conditions. The market value of the renewable option may fall below the premium price shown on the account statement when the market price of the underlying security falls below the strike price. For example, if there is a market in renewable options such that renewable call options for XXX Corp. at a strike price of $95 have a market value when the price of shares of that stock fall below $95, the system may automatically re-calculate the premium to reflect that market price. The new premium price may either equal the market price of calls at the $95 strike price, or be related to that market price (e.g. with a fixed or proportionate mark-up from the market price). The re-calculated premium price may be a function of other factors as well, such as the amount of prior premium payments, the difference between the strike price and the market price of the shares, the amount of time before the next renewal date of the option, etc. The data from which the re-calculated premium may be determined may be stored elsewhere in the system, for example in client records or in transactional records, described above. This data will be accessed as necessary to re-calculate the premium price. In no event, however, should the premium price exceed the precalculated premium price.

For the renewable option call in 100 shares of XXX Corp. at a strike price of $100, FIG. 5b indicates a renewal status of B. Under this renewal status, a customer will also be automatically debited for the premium shown ($5.00/share) if the market price of XXX Corp. shares is at or above $100. Renewal status B differs from renewal status A, however, in that the option is not renewed if the price of XXX Corp. shares falls below the strike price ($100) for status B at the expiration/renewal date.

Also shown in FIG. 5b is ownership of a renewable put option in ABC, Inc. at a strike price of $85. The renewal status of this option is E, which (as shown in FIG. 5c) indicates that the put will be renewed unless the market price of the underlying security falls below the strike price on the expiration date. Thus, if price per share of ABC, Inc. is equal to or greater than $85 on the renewal date, the customer account is automatically debited for the amount of the premium. If ABC, Inc. shares are at $85, the premium is $4.25 per option. If the market price exceeds $85, the premium may either remain $4.25, default to a second, lower premium price (e.g. $2 per option), or default to an amount related to the market value of the renewable put option on the renewal date. If the market price of ABC, Inc. is below $85 per share (e.g. $80 per share), the renewable put option is exercised. The exercise will typically result in the former owner of the renewable put option receiving a cash credit equal to the profit from selling the shares of ABC, Inc. to the writer at $85 per share when shares of ABC, Inc. may be purchased at $80 per share (such profit equaling $5 per share) minus commissions or other transactional costs. Alternatively, exercise may result in the former renewable put option owner actually selling 100 shares of ABC, Inc. to a writer at $85 per share.

Although not shown in the display shown in FIG. 5b, other renewal statuses may also be used for renewable call options. One such status is status code C, shown in FIG. 5c. Under status code C, the system will renew the renewable call option if the market price of the underlying security is equal to or less than the strike price of the option, the premium being calculated in one of the ways suggested for renewal status code A and B. However, the renewal status C differs from statuses A and B in that, if the market price of the underlying security exceeds the strike price, the option will be exercised. For exercise, the owner of the renewable option may purchase the number of shares in the underlying security specified in the option from an assigned writer of an identical renewable option at the strike price. Alternatively, the renewable option may be exercised by a cash transaction which credits the option owner with the profit due, minus any applicable commissions.

Additional status codes may be used, or the listed status codes may be combined to provide additional options. For example, an option may be made available which would allow the renewable option owner to exercise the call if the market price of the underlying security exceeds the strike price, and allow the call to expire if the market price of the underlying security is at or below the strike price of the renewable option. Moreover, options may be described in terms of repeated renewals unless an event occurs. For example, the renewable option may have a fixed time limit (e.g. 10 or 20 years). Alternatively, the option may be renewable for the life of its owner, or even permanently (e.g. "permanent option"). Renewal status codes F, G, Y and Z are discussed below.

Turning now to the operation of the system, FIGS. 6, 6a and 6b, show flow charts for a system procedure for buying a renewable option. A request to access the buy-renewable-option system (100) is typically received from a terminal (10, 12) either directly from a customer or through a broker for a customer. The buyer's account code is inputted (102). As an option, the system may branch (104) to a subsystem (106) which will assist a customer or the broker in selecting an appropriate renewable option to purchase, e.g. by displaying available options by field of business.

The desired underlying security and put or call designation is inputted (108). As an example for the purposes of describing the system, it will be assumed that a user has inputted a security by the name of XXX Corp. and that the option desired is a call option. The system may also access the current market data file to determine the current market price of the underlying security, XXX Corp. [not shown].

Typically, the offer to be considered by the buyer will be written directly by the broker. Thus, the system may access the broker/writer's existing offers to write renewable options in the form of calls for XXX Corp. (110, 112). Alternatively, the buyer may choose to access a market database for offers, if available (110, 116.)

The system may display 112 or alternatively 118 the relevant offers by strike price, renewable option price, or other relevant information. The customer can then choose whether to accept an existing offer (114 or alternatively 120). If an offer is accepted, the system may then confirm the transaction (150) and calculate the amount due for purchasing the renewable option (154, 160) (if such amount is not already calculated) and other relevant information, such as the renewal/expiration date (164). At this time, or at another time prior to the renewal/expiration date, the buyer or his/her agent may choose a renewal status code (168), discussed fully above.

The appropriate customer accounts would then be accessed to record the transaction and modify appropriate financial accounts to reflect that the payment is due or has been debited or credited to the customer's and writer's existing accounts (172). Databases are also modified as appropriate to reflect the transaction.

Alternatively, the customer may wish to input a stop, market, or limit order for a particular renewable option (122, 126), either by listing specific terms such as renewable option price and strike price, or by entering an offer conditional on market conditions. This offer will then be placed on the renewable option listing database. The offer will remain on the system until a writer of a renewable option accepts the offer conditions (124) or the offer is cancelled (126). If accepted, the transaction will be confirmed and files updated accordingly (see FIG. 6a).

It is believed that the market in renewable options is most likely to be created by brokers or similar institutions dealing directly with customers desiring to purchase renewable options. Such institutions are likely to set the market conditions for the renewable options. It is also within the spirit of the invention, however, to make the system operable with a renewable option exchange which would accept and match offers to purchase, sell, and write renewable options. In a renewable options exchange, the renewable options may be written by a variety of entities, rather than a single institution such as a broker. Either marketing system is adaptable to the present invention.

Once the transaction takes place, customer account and financial files will be adjusted accordingly (172). The account of the writer, which may be the listing agent or broker or, alternatively, a third party such as a pooled, multi-investor writer's fund, will be appropriately modified to indicate the existence of the renewable options and relevant data such as strike price and number written. Other databases may be updated as necessary, such as transactional records. If the renewable option transaction has been the result of either an offer to sell or an offer to buy the renewable option listed on the renewable option market listing data base, the data base will be adjusted appropriately to indicate that such offers are no longer available. The writer's account may also be adjusted to indicate that the writer must hold an appropriate position in the underlying security for the renewable option. For example, the writer would have an appropriate position if he or she owned a number of shares in XXX Corp. equal to the number of renewable call options purchased by the buyer.

The system may also provide for various billing options. One billing option is the period of time between bills, e.g. monthly or quarterly. Preferably, the billing period would be no longer than the period of time between renewal dates for any given option which is part of the customer's holdings. The billing period may be standardized rather than selected by the customer. Other billing options include the choice of renewal status codes (168), discussed in conjunction with FIG. 5c.

Figure 7:
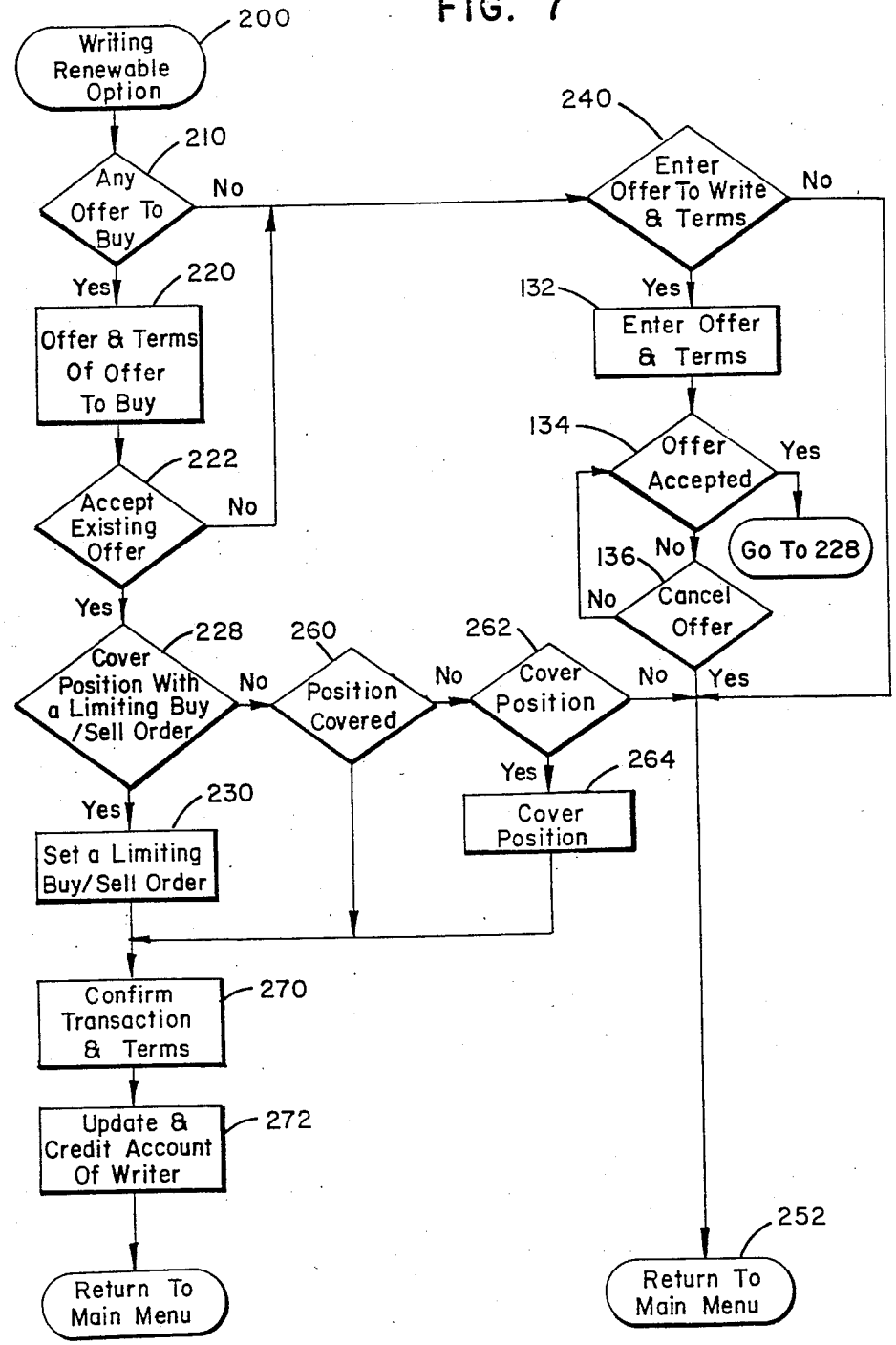
FIG. 7 is a flow chart representing the steps of the renewable option accounting and marketing system for writing a renewable option.

Turning now to FIG. 7, the aspect of the system for processing the writing of a renewable option is shown. As stated previously, the system may involve only a single writer who essentially sets the conditions at which it will write renewable options for customers. Under such circumstances, the writer will determine what underlying securities, strike prices, and renewable options prices will be satisfactory terms for writing options and customers will either accept the terms or not purchase renewable options. Alternatively, the writer may write options at terms more responsive to market conditions. The writer is more likely to be responsive to market conditions when there are other writers from whom customers may purchase the renewable options. In either event, however, it is likely that the writer will make the terms or its offer to write available to potential purchasers, and/or determine whether potential renewable option purchasers exist and on what terms they seek to purchase the renewable option (210, 220). The writer may either list the terms and conditions of its offer to write renewable options (240), or accept the terms of an existing offer to purchase renewable options (222).

Unlike the procedures for purchasing the renewable option, the procedure for writing an option includes a determining of whether the writer has an adequate position in the underlying security to qualify it for writing the option (228). Once the transaction is completed, the writer's account will be updated, with the money received from the purchase of the renewable option credited (270, 272). The flow chart shown in FIG. 7 could be used for either a system for which a variety of entities may be writing renewable options, or alternatively for a system in which the institution which deals with the renewable option purchasers handles the writing of renewable options internally.

Once the number of renewable options to be written is determined, the system determines whether the writer needs to own stock in the underlying security, in the case of a call. In the case of a put, the inquiry would be whether the writer needs to hold a short position in the underlying security, i.e. the funds to cover the underlying security from the put purchasers at the strike price. A determination of whether either of these positions must be held by the writer (228) is determined by comparing the market price of the underlying security to the strike price of the renewable option. In the case of calls, if the market price of the stock is less than the strike price, the writer need not own the underlying security. Instead, the writer need only hold a limit buy order at the strike price. If such an order is not already in place, such an order must be set (230) before the options can be written by the writer. In the case of a put, if the market price of the security is above the strike price, the writer need only have a limit short sale order in the security at the strike price. If such a position is not already held by a writer, such a position will be set (230) before such an option will be written.

If the writer of the option cannot cover his position by entering a limiting buy or sell order, or chooses not to do so, his position may be covered by purchasing the underlying security (in the case of writing renewable call option in that security) (260, 262, and 264). Writers may wish to monitor market conditions so that, for example, stock bought to cover a renewable call option are sold when the price of the stock falls below, the strike price. It should be noted that a renewable call option writer having a margin account will be able to borrow more money to write options (or for other purposes) as the underlying security rises in value, and will have other rights and duties appurtenant to a margin account.

Figure 8:
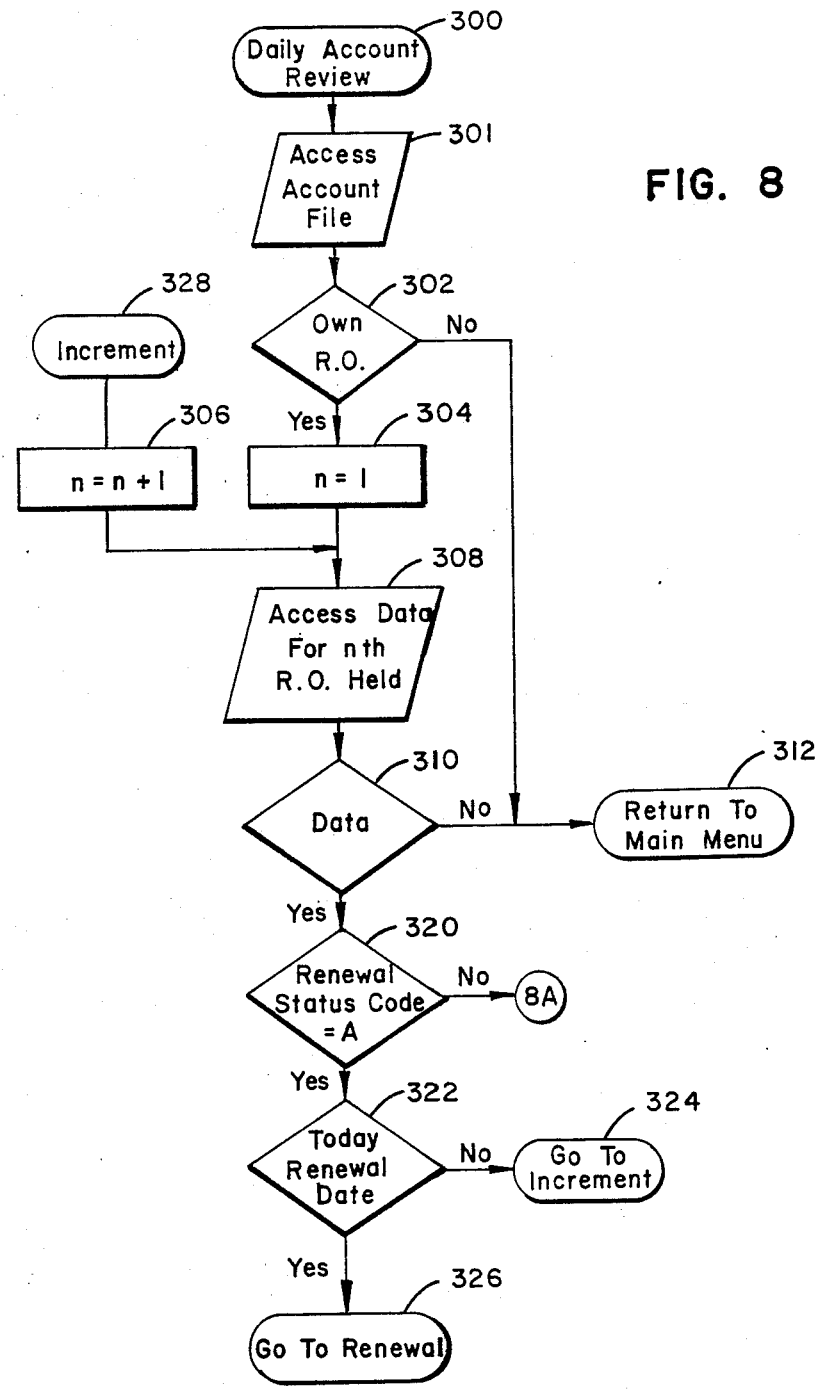
FIGS. 8 and 8a-8f show flow charts representing the steps of the renewable option accounting and marketing system for determining whether to allow a particular renewable option to expire, exercise the renewable option, or renew the renewable option.
Figure 8A:
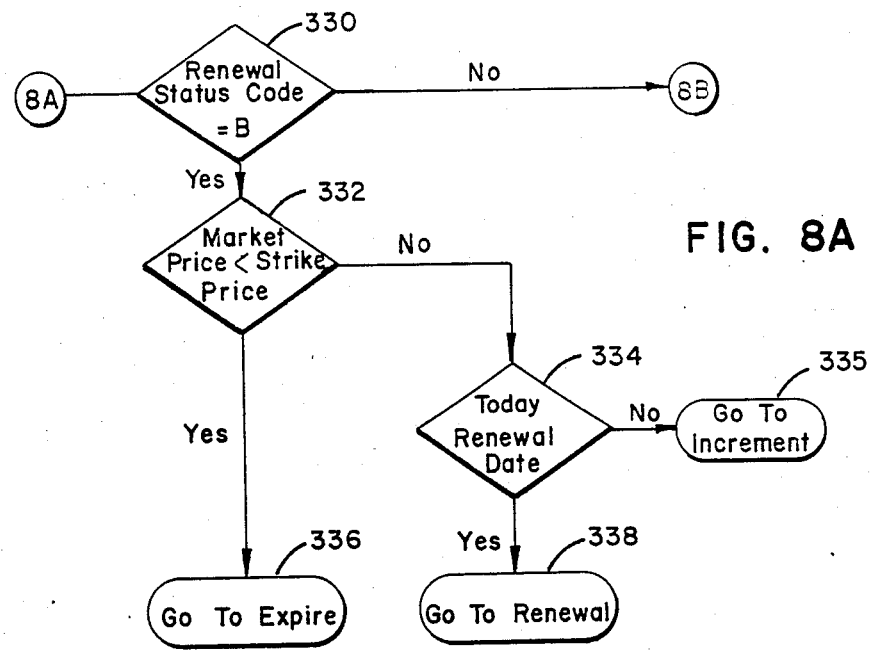
Figure 8B:
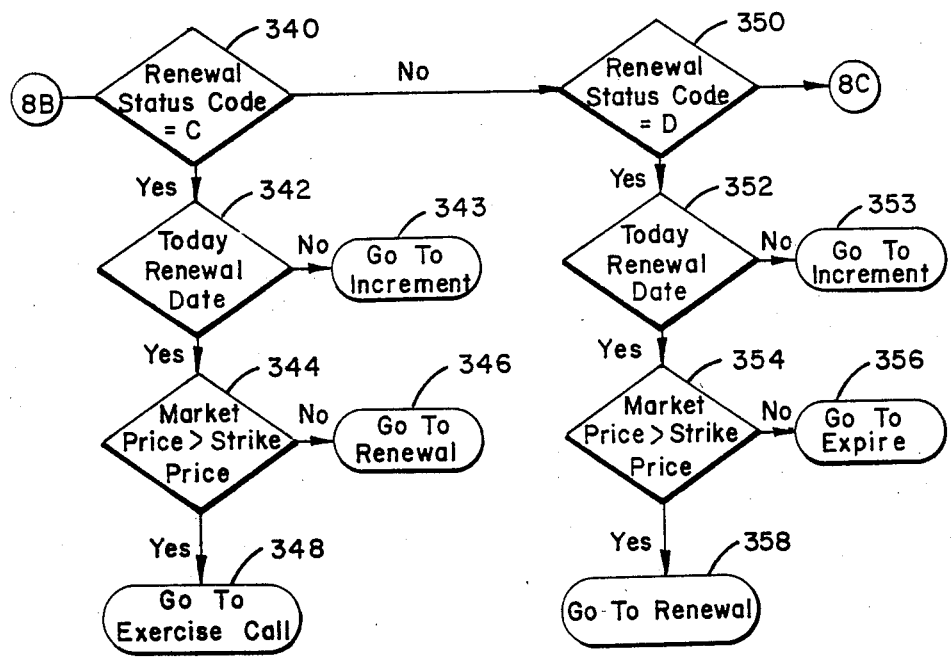
Figure 8C:
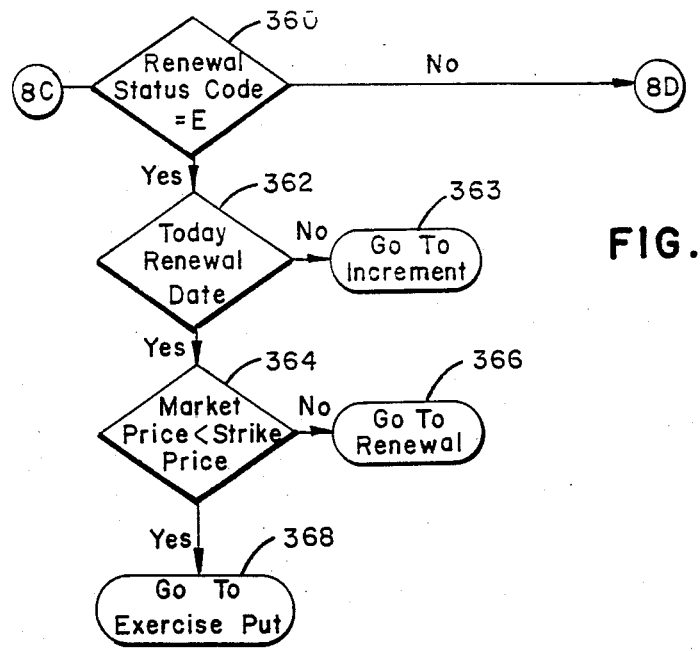
Figure 8D:
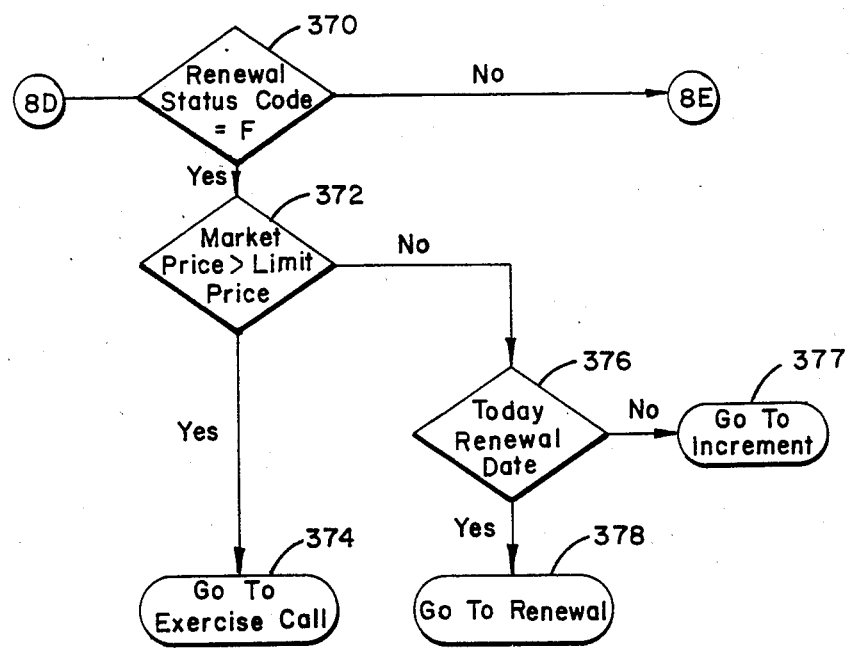
Figure 8E:
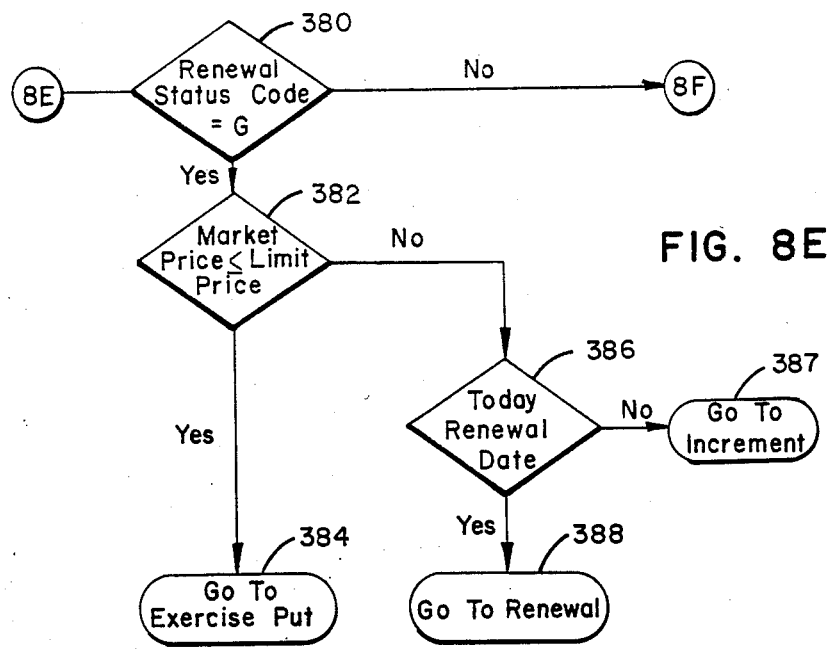
Figure 8F:
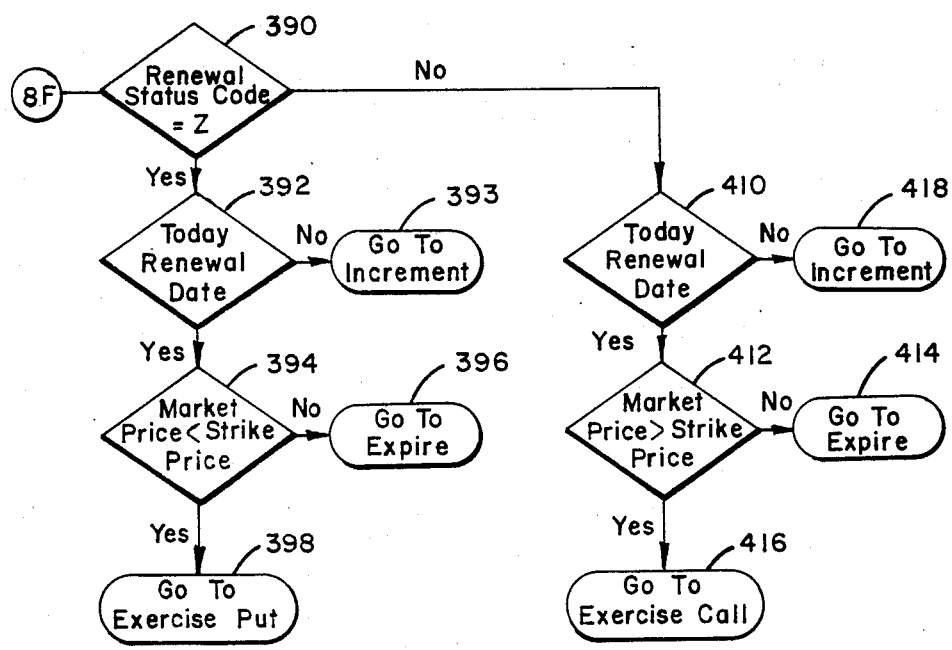

As shown above, each completed renewable option transaction is stored in the buyer's and the writer's account data files. The system reviews each account on a periodic (such as a daily) basis to execute renewal, expiration, or exercise orders according to the renewal status of each renewable option. FIG. 8 is an example of how the system may review each renewable option held in a given customer account. A customer's account file is accessed (300). Unless the customer owns no renewable options (302, 304), the system reviews each renewable option held by the customer individually elements 306 through 418. Whether a given renewable option will be renewed, will expire, or will be exercised depends on the renewal status and any data which provides a condition to the renewal status (e.g. the market price and the strike price of the security in the case of Renewable Status B). Continuing with the example account displayed in FIG. 5b, the XXX Corp. call at a strike price of $95 is reviewed. The renewal status of this option is A. Thus, this option is sent to the RENEWAL subprogram (320, 322), discussed in accordance with FIG. 9. The XXX Corp. call at a strike price of $100 has renewal status B. Thus, if the market price of XXX Corp. is less than $100, the renewable option is processed through the EXPIRE subprogram (330, 332, 336) If the market price of the stock is not less than the strike price of $100, the system will branch to the renewal date query (330, 332, 334). Further, if the renewal date is today, the renewable option is processed through the RENEWAL subprogram (334, 338). Otherwise, if the renewal date is not today, the system branches to the INCREMENT subprogram (334, 335). Each renewable option is similarly processed and referred to either the renewal, expiration, or exercise program.

As shown in FIG. 8, renewal status code C will result in a branch to the EXERCISE CALL subprogram if the market price of the underlying security exceeds the strike price. Otherwise, the system branches to the RENEWAL subprogram. For renewal status D, the system branches to the EXPIRE subprogram if the market price of the underlying security exceeds the strike price of the renewable put option. Otherwise, the system branches to the RENEWAL subprogram. For renewal status E, the system will branch to the EXERCISE subprogram if the market price is less than the strike price of the renewable put option. Otherwise the system branches to the RENEWAL subprogram.

Renewal status codes may also give the system instructions according to the market price of the security underlying the renewable options. Renewal status codes F, G, H, and I in FIG. 5c are examples of such codes. Selection of renewal status code F, for example, instructs the system to exercise the renewable call option when the market price of the security underlying the renewable option is equal to or greater than a selected limit price. For example, an owner of a renewable call option, e.g., ABC Corp., a strike price of one hundred may enter an order to sell the call option if the market price of the security is at least $110 in order to receive at least ten dollars per renewable option (minus commissions). If the market price of the underlying security does not equal or exceed $110 during the renewable option period, the option will be renewed. Renewal status code G operates reciprocally for a renewable put option.

A variety of other status codes may be used as well. Two additional status codes, labeled Y and Z, are shown so labeled because they are default status codes to be used if no other status code is selected. Status code Y pertains to renewable call options. Under this status, the option will be exercised automatically at the end of the renewable option premium period if the market price of the underlying security exceeds the strike price of the option. If the market price of the underlying security does not exceed the strike price of the option at the end of the period, the option is allowed to expire. Renewable options status code Z pertains to renewable put options. Under that status, the option will be renewed if the market price of the underlying security is less than the strike price of the renewable put option. The option will be allowed to expire if the market price of the underlying security is not less than the strike price of the option.

Not shown on the Renewal Status Code Chart, but another option with the described system, is the provision of an instant exercise option. Such an option would direct the system to exercise the option at current market conditions immediately. Addition of this option could be easily achieved by having the system respond to an input commanding the system to go immediately to the exercise CALL subprogram (see FIG. 10).

As is clear from FIGS. 8 and 8a-8f, a variety of other renewal status codes may be used with other branching conditions. For example, another that could be used is an option that would automatically exercise a renewable call option if the market price of the security was above the strike price, and allow the renewable call option to expire if the market price was at or below the strike price of the security.

Figure 9:
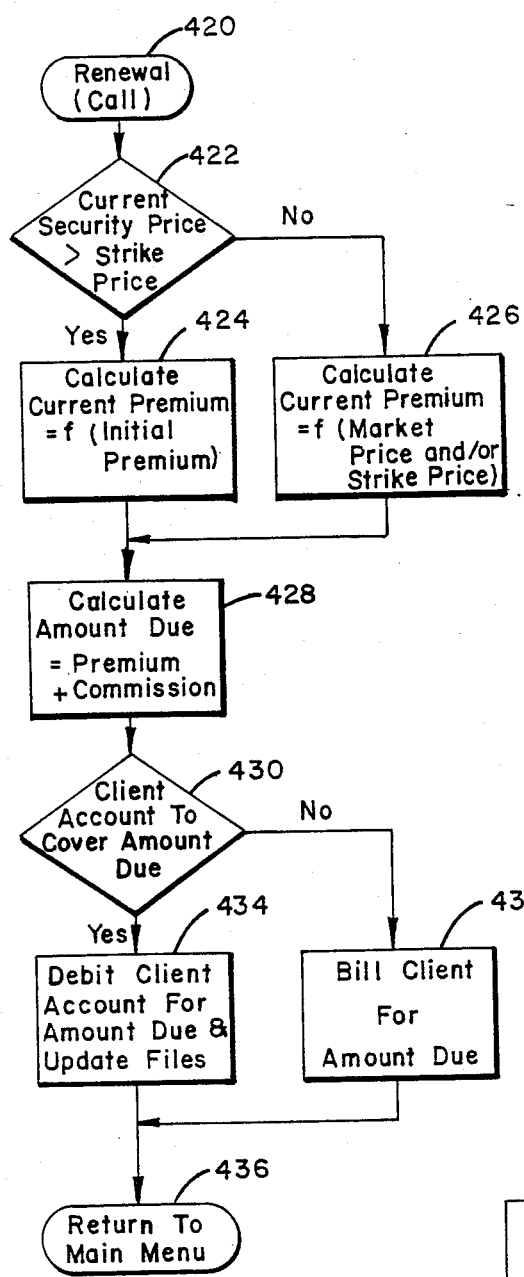
FIG. 9 is a flow chart representing the steps of the renewable option accounting and marketing system for renewing the renewable option.

FIG. 9 shows the RENEWAL subprogram procedure for renewing a renewable option. The procedure shown is for a renewable call option. A renewal put option would be treated similarly on renewal except that the determination of whether the current premium is a function of the initial premium (424) or a function of current market price of the underlying security, the strike price, and/or the current market value of the renewable option (426) would be conditioned on whether the market price of the underlying security was lower rather than higher than the strike price. Once the premium is determined, the client account is debited in the amount of the premium payment and the data regarding the owner and the renewable option are stored to indicate the basis for the debit. The premium payment due to the writer is calculated and credited although not shown in the flow chart shown in FIG. 9. Commissions will be added to or deducted from the payments made and received by the renewable option owner and writer, respectively.

Figure 10:
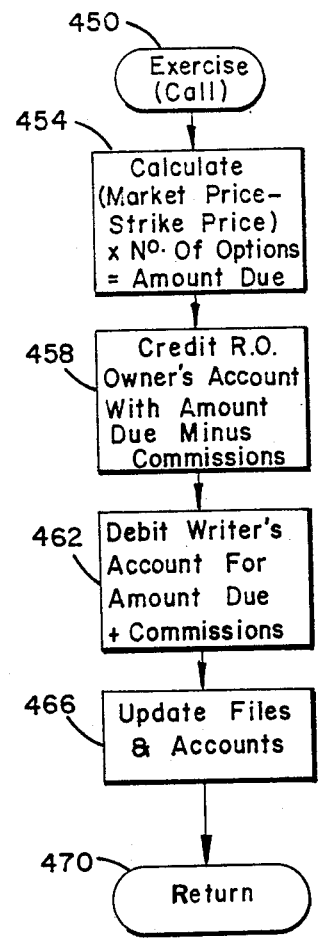
FIG. 10 is a flow chart representing the steps of the renewable option accounting and marketing system for exercising a renewable option.

FIG. 10 shows the EXERCISE (CALL) subprogram procedure for exercising a renewable call option. The procedure shown is consistent with exercising a renewable option in accordance with a renewal status automatically on the renewal/expiration date, or alternatively of being used should a renewable option owner desire to exercise the option immediately. The program is shown for exercising a renewal call option. As shown, the amount due (equal to the number of renewable options owned, multiplied by the difference between the market price and the strike price of the security, minus any commissions or additional expenses) is calculated. A renewal put option exercise will be processed similarly except that, at 454, the calculated amount due will depend on the difference between the strike price minus the market price. The option owner's and writer's accounts and the system files are updated to reflect the effect of exercising the renewable option.

Not shown in FIG. 10, but an alternative to the exercise procedure of FIG. 10, is the provision of a system which would actually transfer shares to the renewable call owner on exercise. Also not shown is the reciprocal alternative system for a renewable put option, which would involve the transfer of shares from the renewable put option owner to the renewable put option writer at the strike price.

In the preferred operation of the system, the writer of a renewable call option will own the stock underlying the option and hold all of the incidents of ownership of that stock including voting rights and the collection of dividends. A writer who sells the underlying security short will be expected to pay dividends on the underlying securities as they accrue. The system may also be adapted for debiting or crediting of a writer's account for dividends, as appropriate.

Figure 11:
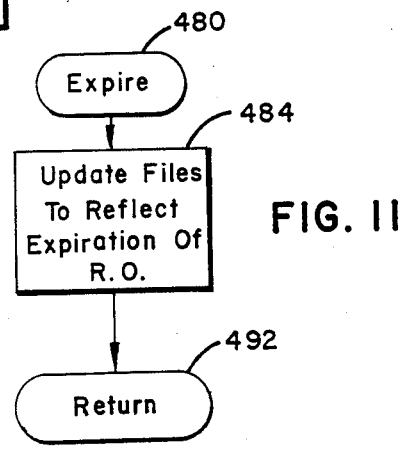
FIG. 11 is a flow chart representing the steps of the renewable option accounting and marketing system for allowing a renewable option to expire.

FIG. 11 shows the EXPIRE subprogram for recording the expiration of a renewable option. As shown, the writer's account is modified to reflect the expiration of the option, which means that the writer does not have to cover a position in the security for which the renewable option was written. The renewable option owner's account is also modified to reflect the expiration of the option.

Not shown on the flow charts or reflected in the status codes, but within the spirit of the invention, is the provision to renewable option purchasers of the right to sell their respective interests in renewable options. For example, the owner of a renewable call option may wish to sell his or her option back to the writer, to the institution which handles his account, or on an open market for trading in renewable call options. Put options may be similarly treated. Such a system would include access to information from which the market value of the renewable option could be determined, means for storing records of the transfer of ownership, and means for updating customer and transactional data files to reflect the transfer of ownership and the crediting and debiting of accounts.

The system has standard features of systems for processing customer investments and accounts. For example, customers will be periodically provided with account statements and, if necessary, billing statements reflecting the status of their accounts, how that status has changed over the previous period, and any payments due from or to the account holder. Monthly or quarterly statements will typically be adequate for most investors, major clients or writers may desire updates daily or even more frequently. The system will also accept deposits, such as premium payments, from customers, crediting them to their accounts. The system will also be capable of taking into account changes in the situation of the underlying securities, such as stock splits, mergers, buy-outs, etc.

The system shown is believed to be acceptable to regulatory agencies. The invention should be construed as including any obvious modifications required by regulatory agencies now or in the future, however.

What is claimed is:

1. An automated renewable option accounting and marketing system comprising:
    first data storage means for storing data describing a holding in a renewable option in an underlying security;
    second data storage means for storing criteria under which the renewable option will be renewed;
    access means for accessing market and date data from which a determination can be made as to whether the renewal criteria has been satisfied; and
    data processing means for processing said first data storage means data, said second data storage means data, and said market and date data such that the renewable option is renewed when the renewal criteria are satisfied.

2. The automated renewable option accounting and marketing system according to claim 1 wherein the first data storage means includes means for storing renewal premium data from which the renewal premium may be calculated; and the data processing means includes means for determining the amount of renewal premium.

3. A method for accounting and marketing a renewable option transaction involving an underlying security comprising the steps of:
    storing transaction data describing a transaction in renewable options for an underlying security including the number of renewable options purchased, a strike price of the renewable option, and renewal data from which to calculate a renewal premium of the renewable option on renewal;
    storing market and date criteria under which the renewable options will be renewed;
    accessing market and date data from which a determination can be made as to whether the renewal criteria have been satisfied;
    processing the transaction data, the market and date criteria, and the market and date data to determine whether to renew the renewable option; and
    processing the renewal data and market data to determine the renewal premium.

4. The method for accounting and marketing a renewable options transaction in accordance with claim 3 wherein the step of storing the market and date criteria includes storing criteria for indicating that the renewable option is not to be renewed after a selected date.

5. The method for accounting and marketing a renewable option transaction in accordance with claim 3 further comprising the steps of:
    storing the market and date criteria under which the renewable options will be exercised; and
    processing the transaction data, market and date data, and market and date criteria to determine whether the renewable option should be exercised.

6. The method for accounting and marketing of a renewable option transaction in accordance with claim 3 further comprising the steps of:
    storing the market and date criteria under which the renewable options will be allowed to expire; and
    processing the market and data criteria and market and dated data to determine whether the renewable option should be allowed to expire.

7. The method for accounting and marketing a renewable option transaction in accordance with claim 3 further comprises the steps of:
    storing the market and date criteria under which the renewable options will be sold; and processing the market and data criteria and market and date data to determine whether the renewable options should be sold.

8. The method for accounting and marketing a renewable option transaction in accordance with claim 3 wherein processing the renewal data and market data to determine the renewal premium includes the step of setting the renewal premium at an amount which is a function of the original premium of the renewable option under certain criteria.

9. The method for accounting and marketing a renewable option transaction in accordance with claim 3 wherein processing the renewal data and market data to determine the renewal premium includes the step of setting the renewal premium at an amount which is not a function of the original renewable option premium and is less than the original renewal option premium under certain criteria.

10. An automated renewable option accounting and marketing system for a transaction involving an underlying security comprising;
 (a) terminal means for entry and display of data including customer data and renewable option transaction data including buy and sell data;
 (b) programmed processor means for processing the data entered at the terminal means;
 (c) first data communications means for providing data transfer between the terminal means and the programmed processor means;
 (d) data storage means electrically interconnected to the programmed processor means for storing data including data entered at the terminal means, the data stored in the data storage means including individual customer data including customer name, address, and account identifier data and renewable option transaction data including transaction identifier data and renewable option premium data;
 (e) means interconnected to the programmed processor means for providing the programmed processor means with date data and market data; and
 (f) program means for processing the renewable option premium data, date data and market data to determine whether a renewal premium is due and the amount of the renewal premium due.

11. An automated renewable option accounting and marketing system in accordance with claim 10 further comprising:
 processor means for automatically processing and confirming a renewal transaction of the renewable option, including the processing of the renewal premium and processing the customer account to reflect the renewal of the option.

12. An automated renewable option accounting and marketing system in accordance with claim 10 comprising:
 processing means for renewing the renewable option by automatically processing a subsequent transaction in the renewable option, the renewal premium determinable as a function of the stored renewable option transaction data, data data, and market data; said processing to occur before said renewable option expires.

13. A renewable option accounting and marketing system according to claim 12 wherein the processing means is further responsive to the renewable option premium data, date data, and market data such that the renewable option will prevent renewal after a fixed period of time.

14. A renewable option accounting and marketing system according to claim 10 wherein the program means includes means for renewing the option for the lifetime of the option owner.

15. A renewable option accounting and marketing system according to claim 10 wherein the program means includes means for renewing the option without any time limit.

16. A renewable option accounting and marketing system according to claim 10 further comprising processing means responsive to an exercise criteria for processing and confirming the exercise of the renewable option.

17. A renewable option accounting and marketing system according to claim 10 further comprising processing means responsive to sell criteria for processing the sale of the renewable option.

18. A renewable option accounting and marketing system according to claim 10 further comprising means responsive to expiration criteria for processing the expiration of the renewable option.

19. A renewable option accounting and marketing system according to claim 10 further comprising means for placing a request to complete a transaction in said renewable option including:
 means for proposing terms of the renewable option transaction including renewable option strike price data and renewable option market price data;
 means for transferring the proposed terms of the renewable option transaction request to a market database; and
 means for responding to an acceptance of the request by processing and confirming the transaction according to the accepted transaction terms.

20. A renewable option accounting and marketing system according to claim 10 wherein the program means includes means for calculating a renewal premium which is a function of the market price of the underlying security at a time subsequent to the time of the initial investment transaction.

21. A renewable option accounting and marketing system according to claim 10 further comprising means for periodically providing customer account information including the number of renewable options held by the customer, said information including an identifier of the security underlying the renewable option, the strike price of each renewable option, the renewal date of each renewable option, and the next renewal premium of each renewable option.

22. A renewable option accounting and marketing system according to claim 10 further comprising means for periodically debiting customer accounts, billing customers for renewal premiums, and confirming renewal option transactions, renewals and expirations.

23. A renewable option accounting and marketing system according to claim 10 further comprising means for selecting a renewal period.

24. A renewal option accounting and marketing system according to claim 10 further comprising means for matching offers to buy renewable options with offers to sell renewable options to complete transactions in renewable options.

25. An automated renewable option accounting and marketing system comprising:
 first processing means responsive to a customer information request for accessing customer account information;

second processing means responsive to a transaction request for accessing market data indicating the terms and availability of a transaction in a permanent option in an underlying security at a strike price;

third processing means for making said market data available to a user of the system;

first program means responsive to a transaction request by the user of the system for determining whether the customer account includes holdings adequate for the customer to write a requested number of renewable options at the strike price;

second program means responsive to said determination of the adequacy of the customer account holdings that such holdings are adequate for processing and confirming a transaction in said permanent option at a particular strike price and renewable option premium;

storage means for storing initial transaction data including said strike price, said initial renewable option premium, renewal data and the market price of said underlying security; and fourth processing means for processing and monitoring renewal transactions and expirations of said renewable options.

* * * * *